US008954602B2

(12) United States Patent
Seifert et al.

(10) Patent No.: US 8,954,602 B2
(45) Date of Patent: Feb. 10, 2015

(54) FACILITATING COMMUNICATION BETWEEN ENTERPRISE SOFTWARE APPLICATIONS (75) Inventors: Hartwig Seifert, Elchesheim-Illingen (DE); Otto Boehrer, Wiesloch (DE); Artur Godlinski, Heidelberg (DE); Joerg Kessler, Nussloch (DE); Jens Kisker, Heidelberg (DE); Thomas Kunz, Lobbach/Lobenfeld (DE); Eugen Pritzkau, Wiesloch (DE); Stefan Rossmanith, Walldorf (DE); Duong-Han Tran, Bad Schoenborn (DE)

(73) Assignee: SAP SE, Walldorf (DE)

( * ) Notice: Subject to any disclaimer, the term of this patent is extended or adjusted under 35 U.S.C. 154(b) by 317 days.

(21) Appl. No.: 13/484,483

(22) Filed: May 31, 2012

(65) Prior Publication Data
US 2013/0325921 A1 Dec. 5, 2013

(51) Int. Cl.
*G06F 15/173* (2006.01)
(52) U.S. Cl.
USPC .......................................... 709/238; 709/203
(58) Field of Classification Search
CPC ............... H04L 29/0809; H04L 29/06047; H04L 29/08072; H04L 29/06; H04L 12/66; H04L 41/0893; H04L 45/00; H04L 45/24; H04L 63/0281; H04L 67/02; H04L 67/28; H04L 67/2823; H04L 69/329; G06F 15/16; G06F 9/541
USPC ................................................. 709/203, 238
See application file for complete search history.

(56) References Cited

U.S. PATENT DOCUMENTS

| | | | |
|---|---|---|---|
| 7,171,432 B2 | 1/2007 | Wildhagen et al. |
| 7,263,698 B2 | 8/2007 | Wildhagen et al. |
| 7,370,007 B2 | 5/2008 | Schwarze et al. |
| 7,373,424 B2 | 5/2008 | Surma et al. |
| 7,380,205 B2 | 5/2008 | Bezrukov |
| 7,565,443 B2 | 7/2009 | Rossmanith et al. |
| 7,573,901 B2 | 8/2009 | Hofmann et al. |
| 7,587,386 B2 | 9/2009 | Rabetge et al. |
| 7,603,476 B1 | 10/2009 | Hofmann et al. |
| 7,624,092 B2 | 11/2009 | Lieske et al. |
| 7,680,945 B2 | 3/2010 | Hoffmann et al. |

(Continued)

FOREIGN PATENT DOCUMENTS

| | | |
|---|---|---|
| WO | WO 2007/064876 | 6/2007 |
| WO | WO 2008/021372 | 2/2008 |
| WO | WO 2008/040085 | 4/2008 |

OTHER PUBLICATIONS

EPO Search Report mailed Oct. 9, 2013 from EPO Application No. 13002746.9-1957; 8 pages.

*Primary Examiner* — Christopher Biagini
(74) *Attorney, Agent, or Firm* — Fish & Richardson P.C.

(57) ABSTRACT

Methods, systems, and apparatus, including computer programs encoded on a computer storage medium, for facilitating communication between enterprise software applications. Some enterprise software systems communicate using a message protocol designed for use with an exchange system. Those systems require the exchange system to communicate using that message protocol. To communicate with systems using that message protocol, a local system can build a message formatted in accordance with the message protocol, even without an exchange system. The local system stores configuration data and uses the configuration data to build the message.

26 Claims, 3 Drawing Sheets

(56) References Cited

U.S. PATENT DOCUMENTS

| | | | |
|---|---|---|---|
| 7,689,709 B2 * | 3/2010 | Surma et al. | 709/236 |
| 7,788,319 B2 | 8/2010 | Schmidt et al. | |
| 7,792,975 B1 * | 9/2010 | Dashora et al. | 709/228 |
| 7,849,445 B2 | 12/2010 | Tran | |
| 7,865,606 B1 | 1/2011 | Tewes et al. | |
| 7,940,409 B2 | 5/2011 | Rajput | |
| 7,971,209 B2 | 6/2011 | Eberlein et al. | |
| 8,060,411 B2 | 11/2011 | Shestakov et al. | |
| 8,620,989 B2 * | 12/2013 | Eisner et al. | 709/201 |
| 2003/0161295 A1 * | 8/2003 | Shah et al. | 370/352 |
| 2006/0020678 A1 | 1/2006 | Kessler et al. | |
| 2007/0233574 A1 | 10/2007 | Koegler et al. | |
| 2008/0120129 A1 | 5/2008 | Seubert et al. | |
| 2008/0288513 A1 | 11/2008 | Bezrukov et al. | |
| 2008/0288549 A1 | 11/2008 | Rabetge et al. | |
| 2008/0288960 A1 | 11/2008 | Eberlein et al. | |
| 2010/0070556 A1 | 3/2010 | Heusermann et al. | |
| 2010/0082497 A1 | 4/2010 | Biesemann et al. | |
| 2010/0107176 A1 | 4/2010 | Kessler | |
| 2010/0161712 A1 | 6/2010 | Mehta et al. | |
| 2010/0161821 A1 * | 6/2010 | Slamkovic | 709/230 |
| 2011/0307295 A1 | 12/2011 | Steiert et al. | |
| 2012/0158993 A1 * | 6/2012 | McNamee et al. | 709/238 |
| 2013/0044749 A1 * | 2/2013 | Eisner et al. | 370/392 |

* cited by examiner

FACILITATING COMMUNICATION BETWEEN ENTERPRISE SOFTWARE APPLICATIONS

TECHNICAL BACKGROUND

This disclosure relates to communication between enterprise software applications.

BACKGROUND

Companies face an increasing need for integration of and collaboration among enterprise software applications. Enterprise software applications that operate within a company's intranet can communicate with enterprise software applications of other companies and entities via the Internet. To facilitate communicate between incompatible systems, enterprise software applications can communicate via an exchange system. Some enterprise software applications send messages to the exchange system using a particular message protocol for use with the exchange system.

SUMMARY

In general, one aspect of the subject matter described in this specification can be embodied in methods that include the actions of receiving, from a sending enterprise software application executing on one or more local computers, a request to send an outbound message to a destination enterprise software application executing on one or more destination computers, the request specifying a message payload and a message protocol, the message protocol specifying a message format for messages to send to an exchange system that translates messages between enterprise software applications; reading configuration data, stored by the one or more local computers, for the sending enterprise software application and the destination enterprise software application; building the outbound message at the one of more local computers, including building a message header using the configuration data and including the message header and the message payload in the outbound message; and sending the outbound message to the destination enterprise software application. Other embodiments of this aspect include corresponding systems, apparatus, and computer programs, configured to perform the actions of the methods, encoded on computer storage devices. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

These and other embodiments can each optionally include one or more of the following features. The configuration data includes technical addressing information, and wherein building the outbound message includes building the message header using the technical addressing information, and wherein the technical addressing information specifies one or more of: a connection scheme, a network address for the one or more destination computers, a network port for the one or more destination computers, a network path for the one or more destination computers, and a timeout value. The configuration data includes authentication data, and wherein building the outbound message includes building the message header using the authentication data. The authentication data specifies an authentication method and data specific to the authentication method. The configuration data includes logical addressing information, and wherein building the outbound message includes building the message header using the logical addressing information, and wherein the logical addressing information specifies a logical receiver party name for the destination enterprise software application. The logical addressing information specifies a logical sender party name for the local enterprise software application. The logical addressing information specifies a sender service or a receiver service or both. The configuration data includes a mapping of interface names, and wherein building the outbound message includes mapping an internal interface name for the local enterprise software application to an external interface name for the destination enterprise software application using the mapping of interface names, and wherein building the outbound message includes building the message header using the external interface name.

Particular embodiments of the subject matter described in this specification can be implemented so as to realize one or more of the following advantages. Entities, e.g., small and medium sized enterprises, can use hosted software on a local system to avoid cost and technical complexity. Applications on the hosted system can communicate with other system using a message protocol. The message protocol specifies a message format for an exchange system. The hosted system need not use an exchange system, so the cost and complexity of the hosted system can be reduced compared to systems including an exchange system. Other entities using on-premise computer systems can also reduce cost and complexity of communication by avoiding the use of an exchange system.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

This specification describes systems, methods, apparatus, and computer-readable media for point-to-point connectivity for enterprise software applications. Some enterprise software systems communicate using a message protocol designed for use with an exchange system. Those systems require the exchange system to communicate using that message protocol. To communicate with systems using that message protocol, a local system can build a message formatted in accordance with the message protocol, even without an exchange system. The local system stores configuration data and uses the configuration data to build the message.

Figure 1:
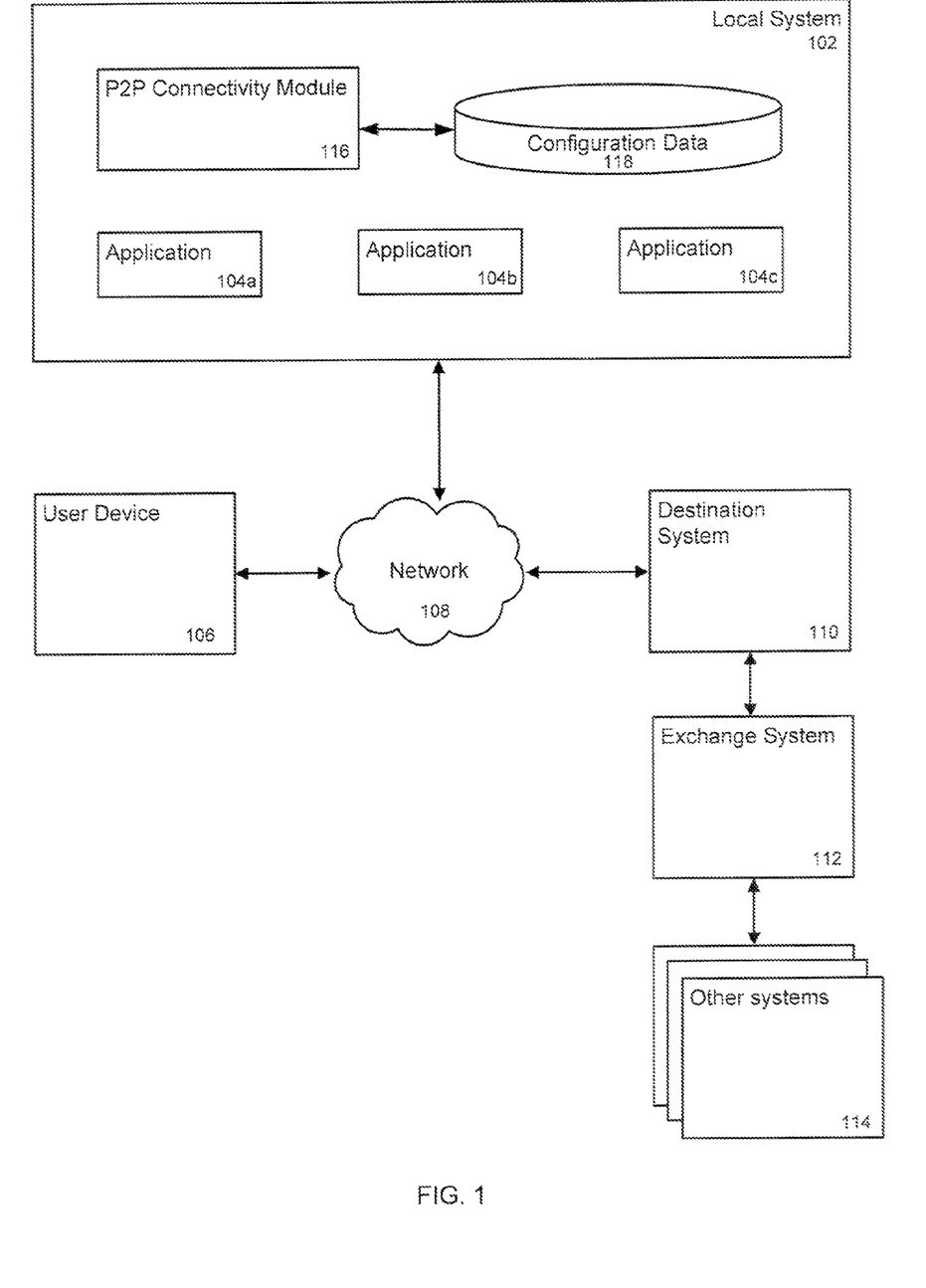
FIG. 1 is a schematic diagram of a local system configured to build messages according to a message protocol.

FIG. 1 is a schematic diagram of a local system 102 configured to build messages according to a message protocol. The local system can be implemented as a system of one or more computers.

The local system can host one or more applications 104a-c. The applications can be enterprise software applications. For example, the applications can perform actions for customer relationship management (CRM), enterprise resource planning (ERP), human resource management (HRM), content management (CM), and so on. The local system can host the applications using a software delivery model in which applications and data are centrally hosted. A user on a user device 106 can access the local system over a data communications network 108, e.g., the Internet. This is useful, for example, because the user does not need to purchase and physically house computing devices to execute the applications.

The local system 102 can communicate over the network 108 with a destination system 110 of one or more computers. The destination system can execute one or more enterprise software applications. The destination system communicates via an exchange system 112 with one or more other system 114.

The exchange system is a system of one or more computers. The exchange system provides a central repository of information and facilitates translation and exchange of information across different and possibly incompatible software platforms. The exchange system can centrally store information usable by various parties accessing the system. The exchange system can also facilitate exchanging information between platforms that are otherwise unable to exchange data due to formatting and translation incompatibilities. The exchange system can convert documents and other data between different formats.

The destination system and the other systems communicate with the exchange system using a particular message protocol for use with the exchange system. Because of this, it is useful for the local system to communicate with the destination system using that particular message protocol. However, some entities, e.g., small and midsize enterprises, prefer to host applications on the local system to avoid the cost and technical complexity of having an exchange system. Therefore, it is useful for the local system to build messages according to the message protocol without using the exchange system.

The local system includes a point-to-point (P2P) connectivity module 116. The P2P connectivity module is configured to build messages that are formatted according to the message protocol. After building messages, the local system can send the messages to the destination system, and the messages need not pass through the exchange system. The local system can also send messages to the other systems via the exchange system. In some implementations, the P2P connectivity module manages connection data, e.g., Transmission Control Protocol (TCP) connection data, for multiple other systems.

The P2P connectivity module builds messages using configuration data stored in a configuration data repository 118 of the local system. The configuration data includes various types of information useful for translation and exchange of data across different and possibly incompatible software platforms. The configuration data can include specific configuration data for the applications hosted on the local system.

The P2P connectivity module can also process received messages from the destination system or other systems that are formatted according to the protocol. The module translates information in received messages and strips away information from received messages as appropriate before passing received messages to hosted applications on the local system.

Figure 2:
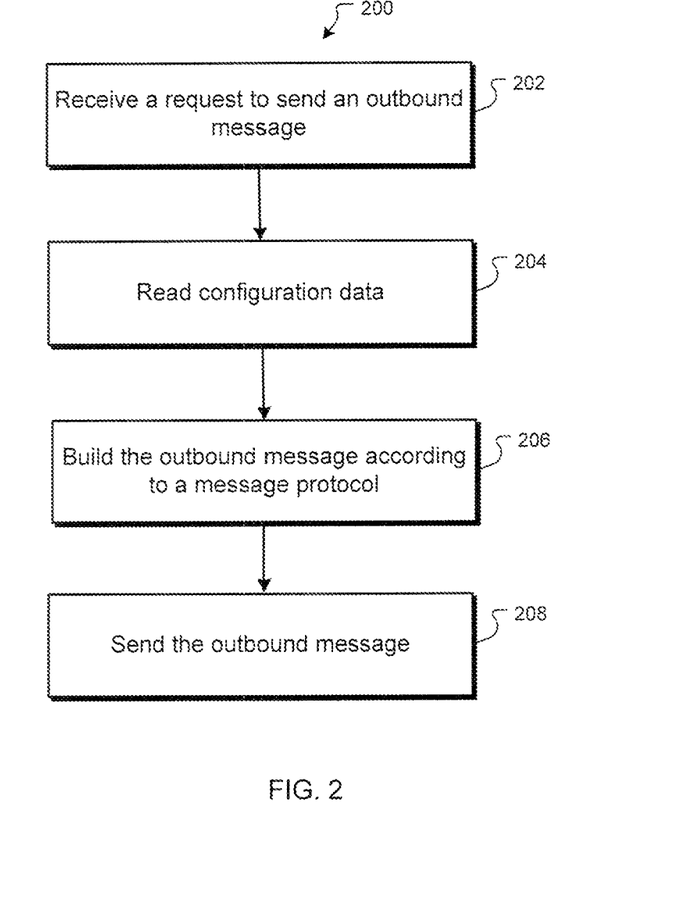
FIG. 2 is a flow diagram of an example method for building a message.

FIG. 2 is a flow diagram of an example method 200 for building a message. The method can be performed by a system of one or more computers. For example, the local system 102 of FIG. 1 can perform the method using the P2P connectivity module. For purposes of illustration, the method will be described with respect to a module that performs the method.

The module receives a request to send an outbound message (step 202). The request is from a sending enterprise software application, and the request specifies a destination enterprise software application. The request specifies a message payload and a message protocol. The message protocol specifies a message format for messages to send to an exchange system, e.g., as described above with reference to FIG. 1.

The module reads configuration data, stored locally, for the sending enterprise software application and the destination enterprise software application (step 204). The configuration data can include one or more of technical addressing information, authentication data, logical addressing information, and a mapping of interface names.

Technical addressing information can specify one or more of: a connection scheme, a network address for the one or more destination computers, a network port for the one or more destination computers, a network path for the one or more destination computers, and a timeout value. Authentication data can specify an authentication method and data specific to the authentication method. The authentication data is specific to the destination enterprise software application.

Logical addressing information can specify one or more of: a logical receiver party name for the destination enterprise software application, a logical sender party name for the local enterprise software application, and a sender service or a receiver service or both. A mapping of interface names specifies a mapping between internal interface names for local enterprise software application and external interface names for the destination enterprise software application. An interface name is an identifier used to access a certain application component.

The module builds the outbound message (step 206). The outbound message is a valid message formatted according to the message protocol. The module uses the configuration data and the message payload. The module builds a message header using the configuration data and includes the message header and the message payload in the outbound message.

The module sends the outbound message (step 208). The module can communicate with the destination system according to the technical and logical addressing information specified by the configuration data, e.g., by managing a TCP connection between the sending enterprise software application and the destination enterprise software application.

Figure 3:
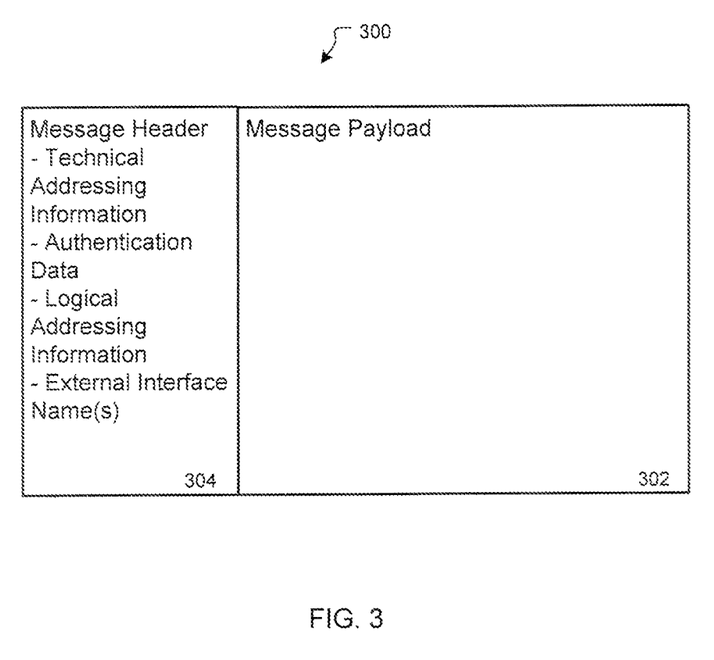
FIG. 3 is a conceptual diagram of an example message formatted for an enterprise software application protocol and for point-to-point connectivity.

FIG. 3 is a conceptual diagram of an example message 300 formatted for an enterprise software application protocol and for point-to-point connectivity. The message includes a message payload 302. The message payload is provided by a sending enterprise software application. The message also includes a message header 304. The message header can include technical addressing information, authentication data, logical addressing information, and one or more external interface names, as discussed above with reference to FIG. 2. The header can include other data as appropriate.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:
    receiving, from a sending enterprise software application executing on one or more local computers, i) a first request to send a first outbound message to a destination enterprise software application executing on one or more destination computers, and ii) a second request to send a second outbound message to the destination enterprise software application executing on the one or more destination computers, the first and second requests specifying a respective message payload and a message protocol, the message protocol specifying a message format for messages to send to an exchange system that translates messages between enterprise software applications;
    reading configuration data, stored by the one or more local computers, for the sending enterprise software application and the destination enterprise software application;
    building the first and the second outbound messages at the one of more local computers, including:
        for the first outbound message, building a message header using the configuration data and including the message header and the respective message payload in the first outbound message;
        for the second outbound message, including the respective message payload in the second outbound message;
    sending the first outbound message to the destination enterprise software application by communicating directly with the one or more destination computers; and
    sending the second outbound message to the exchange system for communicating the second outbound message to the destination enterprise software application.

2. The method of claim 1, wherein the configuration data includes technical addressing information, and wherein building the first outbound message includes building the message header using the technical addressing information, and wherein the technical addressing information specifies one or more of: a connection scheme, a network address for the one or more destination computers, a network port for the one or more destination computers, a network path for the one or more destination computers, and a timeout value.

3. The method of claim 1, wherein the configuration data includes authentication data, and wherein building the first outbound message includes building the message header using the authentication data.

4. The method of claim 3, wherein the authentication data specifies an authentication method and data specific to the authentication method.

5. The method of claim 1, wherein the configuration data includes logical addressing information, and wherein building the first outbound message includes building the message header using the logical addressing information, and wherein the logical addressing information specifies a logical receiver party name for the destination enterprise software application.

6. The method of claim 5, wherein the logical addressing information specifies a logical sender party name for the local enterprise software application.

7. The method of claim 6, wherein the logical addressing information specifies a sender service or a receiver service or both.

8. The method of claim 1, wherein the configuration data includes a mapping of interface names, and wherein building the first outbound message includes mapping an internal interface name for the local enterprise software application to an external interface name for the destination enterprise software application using the mapping of interface names, and wherein building the outbound message includes building the message header using the external interface name.

9. The method of claim 1, wherein sending the first outbound message to the destination enterprise software application further comprises communicating the first outbound message directly to the one or more destination computers exclusive of communicating the first outbound message to the exchange system.

10. The method of claim 1, wherein sending the first outbound message to the destination enterprise software application further comprises communicating the first outbound message directly to the one or more destination computers while bypassing communicating the first outbound message to the exchange system.

11. A non-transitory computer storage medium encoded with a computer program, the program comprising instructions that when executed by one or more computers cause the one or more computers to perform operations comprising:
    receiving, from a sending enterprise software application executing on one or more local computers, i) a first request to send a first outbound message to a destination enterprise software application executing on one or more destination computers, and ii) a second request to send a second outbound message to the destination enterprise software application executing on the one or more destination computers, the first and second requests specifying a respective message payload and a message protocol, the message protocol specifying a message format for messages to send to an exchange system that translates messages between enterprise software applications;

reading configuration data, stored by the one or more local computers, for the sending enterprise software application and the destination enterprise software application;

building the first and the second outbound messages at the one of more local computers, including:

for the first outbound message, building a message header using the configuration data and including the message header and the respective message payload in the first outbound message;

for the second outbound message, including the respective message payload in the second outbound message;

sending the first outbound message to the destination enterprise software application by communicating directly with the one or more destination computers; and sending the second outbound message to the exchange system for communicating the second outbound message to the destination enterprise software application.

12. The non-transitory computer storage medium of claim 11, wherein the configuration data includes technical addressing information, and wherein building the first outbound message includes building the message header using the technical addressing information, and wherein the technical addressing information specifies one or more of: a connection scheme, a network address for the one or more destination computers, a network port for the one or more destination computers, a network path for the one or more destination computers, and a timeout value.

13. The non-transitory computer storage medium of claim 11, wherein the configuration data includes authentication data, and wherein building the outbound message includes building the message header using the authentication data.

14. The non-transitory computer storage medium of claim 13, wherein the authentication data specifies an authentication method and data specific to the authentication method.

15. The non-transitory computer storage medium of claim 11, wherein the configuration data includes logical addressing information, and wherein building the first outbound message includes building the message header using the logical addressing information, and wherein the logical addressing information specifies a logical receiver party name for the destination enterprise software application.

16. The non-transitory computer storage medium of claim 15, wherein the logical addressing information specifies a logical sender party name for the local enterprise software application.

17. The non-transitory computer storage medium of claim 16, wherein the logical addressing information specifies a sender service or a receiver service or both.

18. The computer storage medium of claim 11, wherein the configuration data includes a mapping of interface names, and wherein building the first outbound message includes mapping an internal interface name for the local enterprise software application to an external interface name for the destination enterprise software application using the mapping of interface names, and wherein building the outbound message includes building the message header using the external interface name.

19. A system of one or more computers configured to perform operations comprising:

receiving, from a sending enterprise software application executing on one or more local computers, i) a first request to send a first outbound message to a destination enterprise software application executing on one or more destination computers, and ii) a second request to send a second outbound message to the destination enterprise software application executing on the one or more destination computers, the first and second requests specifying a respective message payload and a message protocol, the message protocol specifying a message format for messages to send to an exchange system that translates messages between enterprise software applications;

reading configuration data, stored by the one or more local computers, for the sending enterprise software application and the destination enterprise software application;

building the first and the second outbound messages at the one of more local computers, including:

for the first outbound message, building a message header using the configuration data and including the message header and the respective message payload in the first outbound message;

for the second outbound message, including the respective message payload in the second outbound message;

sending the first outbound message to the destination enterprise software application by communicating directly with the one or more destination computers; and sending the second outbound message to the exchange system for communicating the second outbound message to the destination enterprise software application.

20. The system of claim 19, wherein the configuration data includes technical addressing information, and wherein building the first outbound message includes building the message header using the technical addressing information, and wherein the technical addressing information specifies one or more of: a connection scheme, a network address for the one or more destination computers, a network port for the one or more destination computers, a network path for the one or more destination computers, and a timeout value.

21. The system of claim 19, wherein the configuration data includes authentication data, and wherein building the outbound message includes building the message header using the authentication data.

22. The system of claim 21, wherein the authentication data specifies an authentication method and data specific to the authentication method.

23. The system of claim 19, wherein the configuration data includes logical addressing information, and wherein building the first outbound message includes building the message header using the logical addressing information, and wherein the logical addressing information specifies a logical receiver party name for the destination enterprise software application.

24. The system of claim 23, wherein the logical addressing information specifies a logical sender party name for the local enterprise software application.

25. The system of claim 24, wherein the logical addressing information specifies a sender service or a receiver service or both.

26. The system of claim 19, wherein the configuration data includes a mapping of interface names, and wherein building the first outbound message includes mapping an internal interface name for the local enterprise software application to an external interface name for the destination enterprise software application using the mapping of interface names, and wherein building the outbound message includes building the message header using the external interface name.

* * * * *